(12) United States Patent
Iseri et al.

(10) Patent No.: US 10,096,803 B2
(45) Date of Patent: Oct. 9, 2018

(54) FLEXIBLE BATTERY

(71) Applicant: Panasonic Intellectual Property Management Co., Ltd., Osaka (JP)

(72) Inventors: Mitsuhiro Iseri, Osaka (JP); Tomohiro Ueda, Osaka (JP); Yuya Asano, Osaka (JP); Haruhisa Yagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 15/003,353

(22) Filed: Jan. 21, 2016

(65) Prior Publication Data
US 2016/0248053 A1      Aug. 25, 2016

(30) Foreign Application Priority Data

Feb. 24, 2015   (JP) .................................. 2015-033532

(51) Int. Cl.
*H01M 2/02* (2006.01)
*H01M 10/0585* (2010.01)
*H01M 10/04* (2006.01)

(52) U.S. Cl.
CPC ....... *H01M 2/0275* (2013.01); *H01M 2/0207* (2013.01); *H01M 10/0436* (2013.01); *H01M 2220/30* (2013.01)

(58) Field of Classification Search
CPC ............. H01M 2/0275; H01M 2/0207; H01M 10/0436; H01M 2220/30
See application file for complete search history.

(56) References Cited

U.S. PATENT DOCUMENTS

| | | | |
|---|---|---|---|
| 2006/0093905 A1* | 5/2006 | Kim | H01M 2/021 429/175 |
| 2010/0330338 A1* | 12/2010 | Boyce | B29C 59/02 428/156 |
| 2016/0043359 A1* | 2/2016 | Miyake | H01M 2/0237 429/90 |
| 2016/0101594 A1* | 4/2016 | Tibbits | B32B 27/12 428/64.1 |
| 2016/0204390 A1* | 7/2016 | Choi | H01M 2/0202 429/176 |
| 2016/0240824 A1* | 8/2016 | Song | H01M 2/0202 |

FOREIGN PATENT DOCUMENTS

JP      2000-173559      6/2000

* cited by examiner

*Primary Examiner* — Muhammad S Siddiquee
(74) *Attorney, Agent, or Firm* — Panasonic IP Management; Kerry S. Culpepper

(57) ABSTRACT

A thin pouch battery, which is used as a power source of a portable electronic apparatus, a portable electronic terminal, or the like, includes protrusions, into which an electrode group is inserted, formed in both a laminate film on the upper side and a laminate film on the lower side. Then, concentrically concave and convex wave shapes (concentric crest ridges or trough furrows) are formed on the top surface of each of the protrusions such that the protrusion can extend or shrink in any direction, or the protrusion has a side surface that is gradually inclined and a wave shape is formed on the side surface of the protrusion.

8 Claims, 9 Drawing Sheets

FLEXIBLE BATTERY

TECHNICAL FIELD

The technical field relates to a flexible battery.

BACKGROUND

A compact portable electronic apparatus or portable electronic terminal such as a smart, phone or a wristwatch type terminal uses a thin, pouch-type battery as a power source.

The thin pouch-type battery has a configuration in which an electrode group including sheet-like positive and negative electrodes and a separator is enveloped between two laminate films, each of which is made of a metal foil or a resin layer having a thickness of about 0.1 mm, and a liquid, gel, or solid electrolyte is injected therein. For the laminate film, a material, which prevents the electrolyte therein from leaking out in a case where the battery is deformed and damaged from an impact or the like due to an external force, in a case of deterioration due to the service life of the laminate film or a temperature, change, or the like, is selected.

Recently, many electronic apparatuses are worn directly on a human body, and for example, some apparatuses are curved, in advance so as to be fitted to a wrist. Therefore, the battery needs to be also curved so as to be fitted to the shape. Accordingly, there is a demand for a thinner and further flexible battery as such a battery.

A thin pouch-type battery in the related art has a wave section formed on the entire laminate film, which has durability but does not have good elasticity, thereby configured to enhance flexibility of the entire laminate film for example, see Japanese Patent Unexamined Publication No. 2000-173559).

FIG. 14 is a view illustrating a thin pouch-type battery in the related art disclosed in Japanese Patent Unexamined Publication No. 2000-173559.

As illustrated in FIG. 14, laminate film 201 disposed on the upper side and laminate film 202 disposed on the lower side are sealed with a positive electrode and a negative electrode and an electrolyte therebetween. Wave shapes 203, which extend straightly in one direction and are arranged parallel to each other, are formed on surfaces of laminate films 201 and 202, respectively, such that flexibility of laminate films 201 and 202 is enhanced.

FIGS. 15A and 15B are views illustrating a manufacturing process of the thin pouch battery.

As illustrated in FIG. 15A, straight continuous wave shapes are formed in parallel at equal intervals on the laminate film of the thin pouch battery. Next, as illustrated in FIG. 15B, the laminate film is folded back with, bending position 206 as a base position and electrode group 207 including a positive electrode, a negative electrode, a separator, an electrolyte, or the like is inserted in the folded laminate film. Then, adhesion is performed on three sides except for the folded portion, and thus the thin pouch battery is obtained.

SUMMARY

FIGS. 16A and 16B are views illustrating a state in which an external force is applied to the thin pouch battery and the thin pouch battery is curved.

As illustrated in FIG. 16A, when ah external force is applied to wave shape 203 formed in the surfaces of laminate films 201 and 202 in perpendicular direction 208, the laminate films have a state of being curved as illustrated in FIG. 16B. At this time, radiuses of laminate film 201 on the upper side and laminate film 202 on the lower side are different due to the curvature such that a difference between circumferential lengths (developed lengths) obtained in the case of being curved is generated.

In other words, the curved length, (circumferential length, of the laminate film is greater than the uncurved length), and a relationship of the uncurved length of the laminate film <the curved length (circumferential length) of the laminate film is established.

The difference between the circumferential lengths indicates wrinkling or cracking (breaking) on the surface of the laminate film. The wrinkling varies in size or shape depending on the state of curvature and the cracking has a significant influence on quality of a product, such as leakage of the electrolyte.

FIGS. 17A and 17B are diagrams illustrating a wrinkling mechanism.

As illustrated in FIG. 17A, when the electrode group is interposed between laminate film 201 on the upper side and laminate film 202 on the lower side, protrusion 209 is formed by the thickness of the electrode group. At this time, L1 represents a length of the top surface of protrusion 209.

Next, as illustrated in FIG. 17B, when laminate films 201 and 202 are curved, deformation is performed with laminate film 202 on the lower side on the inner diameter side as a base. Since radius R2 of the top surface of: protrusion 209 is greater than radius R1 of laminate film 202 on the lower side, curved circumferential length L2 of the top surface of protrusion 209 is greater than uncurved length L1 (L2>L1).

In other words, laminate film 201 on the upper side needs to extend due to the curvature. However, since laminate films 201 and 202 are unlikely to extend, deformation is performed in a direction in which laminate film 202 on the lower side shrinks. Laminate film 202 on the lower side shrinks by the difference between the lengths L1 and L2 (L2-L1) and wrinkling or cracking appears on the surfaces of laminate films 201 and 202.

FIGS. 18A and 18B are diagrams illustrating the curved state in the related art in which a wave shape is formed on the surfaces of laminate films 201 and 202.

When L4 represents a curved circumferential length of the top surface of protrusion 209 as illustrated in FIG. 18B, wave shape 210 is set such that uncurved circumferential length L3 of the top surface of protrusion 209 is greater than L4 (L3≥L4) as illustrated in FIG. 18A. When the films are curved as illustrated FIG. 18B, an extending force is applied to laminate film 201 on the upper side; however, wave 210 on the top surface of protrusion 209 extends, which absorbs the amount of extension (in FIGS. 17A and 17B, L2-L1). As a result, it is possible to prevent the surfaces of laminate films 201 and 202 from wrinkling or cracking.

However, in the configuration of the related art, in a case where an external force is applied in a direction parallel to a ridge of the wave as illustrated in FIG. 19A, and the laminate films are curved in a state as illustrated in FIG. 19B, it is not possible for the wave to extend. As a result, a problem arises in that wrinkling or cracking appears. This is because, as illustrated in FIG. 20, the laminate film, on which the wave shape is formed, extends in a direction perpendicular to the ridge of the wave, but does not extend in a direction parallel thereto. In addition, since the laminate film does not extend in any direction except for the direction perpendicular to the ridge of the wave, that is, in a diagonal direction, wrinkling or cracking is also likely to appear when an external force is applied in the corresponding direction and the film is curved.

FIGS. 21A and 21B are conceptual diagrams of a laminate film in a state in which the laminate film is curved toward the upper side due to an external force.

In a case where curvature occurs toward the upper side as illustrated in FIG. 21B from the state in FIG. 21A, the force is applied in a direction in which wave 210 on the top surface of the protrusion shrinks with laminate film 202 on the lower side as a base. Pitches of the wave shapes become narrow, and thereby an amount of the shrinkage can be absorbed to a certain extent. However, when the amount of the shrinkage becomes greater, it is not possible for the laminate film, to shrink exceeding the certain amount, and wrinkling or cracking is likely to appear.

FIG. 22 is a view illustrating a state in which the laminate film is curved. Since side surface 211 of the protrusion is curved in a state of being vertically upright, the side surface receives an intense force of extension and contraction as illustrated in FIG. 23. Top surface side 212 of the side surface of the protrusion receives the extension force and lower surface side 213 of the side surface of the protrusion receives the compression force. It is not possible for the laminate film to deform along with the extension force and, as a result, cracking is likely to appear in side, surface 211 of the protrusion.

Next, FIG. 24 is a view illustrating a state in a case where the protrusion of the laminate film, which accommodates the electrodes, is sealed on four sides without performing a process in advance. When electrode group 207 is interposed between flat laminate film 201 on the upper side and flat laminate film 202 on the lower side and the four sides of the laminate films are sealed, steps of an electrode group accommodating section, which is formed in the laminate film, cause wrinkling 214 to appear on the four corners. Sealing reliability is lowered due to the wrinkling.

In view of the above problems of the related art, as well as other concerns, a battery is provided in which wrinkling or cracking does not appear in a laminate film, even when, the laminate film is curved upward or downward in any direction.

In order to achieve the above object, the battery according to an embodiment has a protrusion which is formed in advance on a laminate film to match a shape of an electrode group at a portion in which the electrode group is inserted, and then a concave-convex shape is formed on the laminate film, such that the laminate film is extended in any direction. In this state, an external force is applied to the battery and the battery is deformed and curved in every direction.

As above, a battery according to an embodiment has a protrusion, on a laminate film and a concave-convex shape is formed on the laminate film such that, even when an external force is applied to cause deformation or curvature, a problem such as leakage of an electrolyte is solved without wrinkling or cracking in the laminate film, and thus it is possible to improve quality and reliability.

DESCRIPTION OF EMBODIMENTS

Hereinafter, various embodiments will be described with reference to the drawings.

Figure 1:
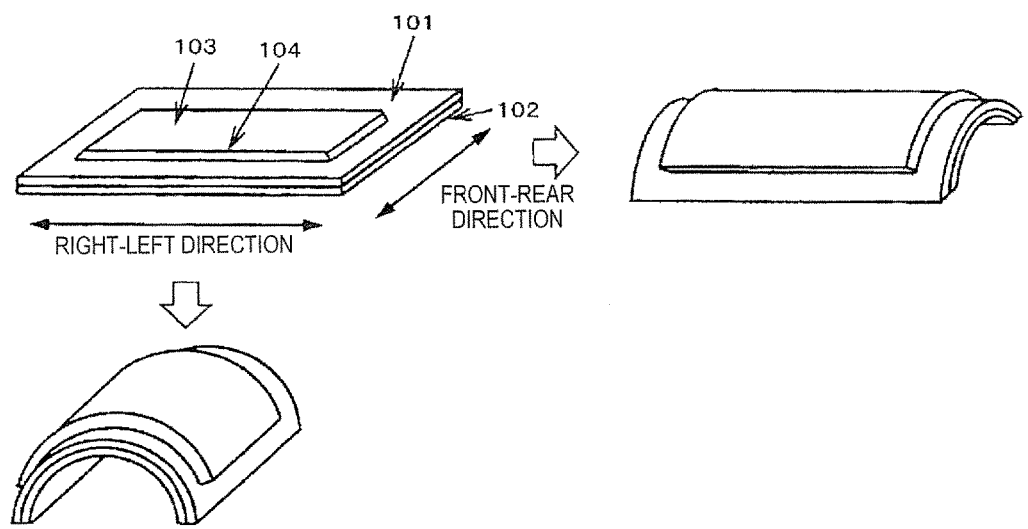
FIG. 1 is a view illustrating a state in which a thin pouch battery is curved in a right-left direction and in a front-rear direction.

FIG. 1 is a view illustrating a state in which a thin pouch battery is curved in a right-left direction or in a front-rear direction. In a curved case, since the difference between extended circumferential lengths after curvature of laminate film 102 on the lower side and a top surface of protrusion 103 in which electrodes are accommodated, of laminate film 101 on the upper side, wrinkling or cracking appears on the surface of the laminate film.

Therefore, according to various exemplary embodiments discussed herein, concave-convex wave shapes are formed on the laminate film, and wave-shaped crest ridges or trough furrows are bent and continuous or are dotted around such that wrinkling or cracking does not appear in the laminate film, even when the laminate film, extends in every direction, thereby being curved in every direction.

Embodiment 1

Figure 2:
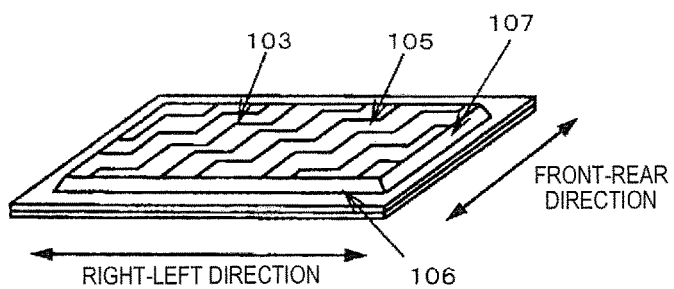
FIG. 2 is a view illustrating a thin pouch battery in which a concave-convex wave-shaped crest ridge or a trough furrow formed on a top surface of a protrusion of a laminate film has a step shape, in Embodiment 1.

FIG. 2 is a view illustrating a state in which a concave-convex wave-shaped crest ridge or a trough furrow formed on a laminate film is bent. Wave-shaped crest ridge or trough furrow 105 formed on the laminate film is parallel to side surfaces 106 of protrusion 103 in the right-left direction, is continuous by a certain length, then is changed in angle, is parallel to side surfaces 107 in the front-rear direction, and is continuous by a certain length.

Wave-shaped crest ridge or trough furrow 105 is in a state of being alternately parallel to side surfaces 106 of protrusion 103 in the right-left direction and to side surfaces 107 thereof in the front-rear direction, and of being continuous in a step shape. In this manner, since wave-shaped crest ridge or through, furrow 105 exists in a state of being parallel to right and left side surfaces 106 and front and rear side surfaces 107 of protrusion 103 and the top surface of protrusion 103 of the laminate film on the upper side extends in front-rear and right-left directions, wrinkling or cracking does not appear, even when the battery is curved in the right-left direction and the front-rear direction.

Figure 3:
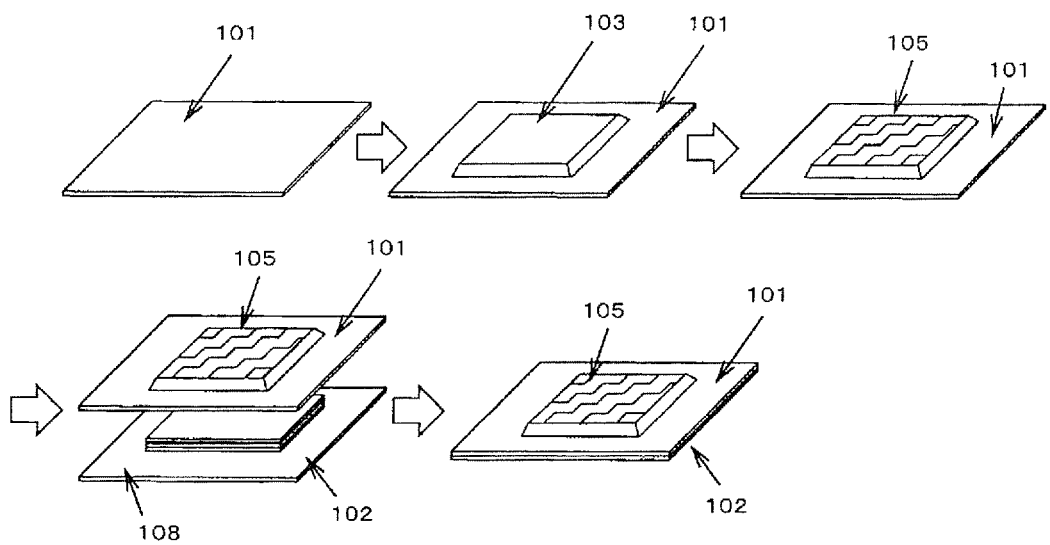
FIG. 3 is a view illustrating a manufacturing process of the thin pouch battery.

FIG. 3 is a view of a manufacturing process of the battery according to an exemplary embodiment. First, protrusion 103 is formed in laminate film 101 on the upper side to match the size of electrode group 108 so as to accommodate electrode group 108. Next, concave-convex wave shape 105 is formed on the top surface of protrusion 103. Then, electrode group 100 is interposed between laminate film 101 on the upper side and laminate film 102 on the lower side and the four sides thereof are sealed.

In the present manufacturing process, protrusion 103 which accommodates the electrode group is formed before the four sides are sealed, and thereby it is possible to prevent wrinkling from appearing on the four corners when the sealing is performed, as in the related, art. In the present, embodiment, after protrusion 103 is formed, wave shape 105 is formed. However, protrusion 103 and the wave shape may be simultaneously formed. The present manufacturing process is applied to all of the following embodiments.

Embodiment 2

Figure 4:
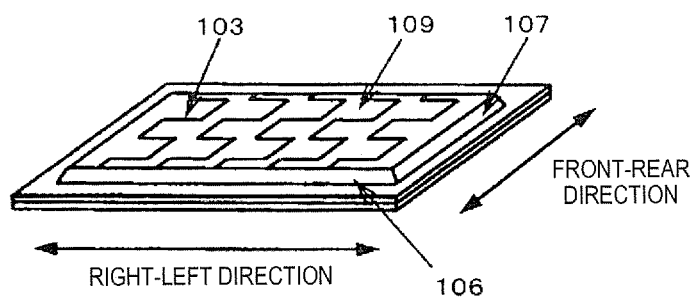
FIG. 4 is a view illustrating a thin pouch battery in which a concave-convex wave-shaped crest ridge or a trough furrow formed on a top surface of a protrusion of a laminate film has a square undulating shape, in Embodiment 2.

FIG. 4 illustrates a state in which the concave-convex wave-shaped crest ridge or trough furrow formed in the laminate film is bent.

The present embodiment is the same as Embodiment 1 in that wave-shaped crest ridge or trough furrow 109 is parallel to side surfaces 106 in the right-left direction and side surfaces 107 in the front-rear direction of protrusion 103; however, the present embodiment is different from Embodiment 1 in that the crest ridge and the trough furrow are continuous to have a square undulating shape. Therefore, the top surface of protrusion 103 of the laminate film, on the upper side extends in the front-rear and right-left directions such that wrinkling or cracking does not appear, even when the battery is curved in the right-left direction and in the front-rear direction.

Embodiment 3

Figure 5:
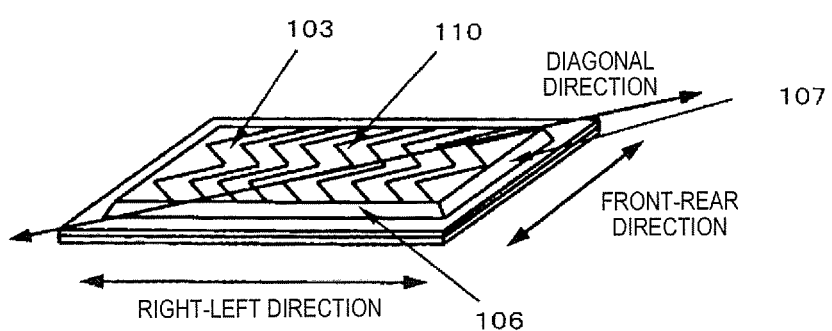
FIG. 5 is a view illustrating a thin pouch battery in which an angle is formed between a side surface of a protrusion and a concave-convex wave-shaped crest ridge or a trough furrow formed on a top surface of the protrusion of a laminate film, in Embodiment 3.

FIG. 5 illustrates a state in which the concave-convex wave-shaped crest ridge or trough furrow formed, in the laminate film is bent.

The present embodiment is the same as Embodiment 1 and Embodiment 2 in that wave-shaped crest ridge or trough furrow 110 is bent and continuous; however, Embodiment 3 is different from Embodiment 1 and Embodiment 2 in that the crest ridge and the trough furrow have an angle with side surfaces 106 and 107 of the protrusion, are continuous, and are bent. Therefore, the top surface of protrusion 103 of the laminate film, on the upper side extends not only in the front-rear and right-left directions, but also in a diagonal direction, such that wrinkling or cracking does not appear, even when the battery is curved in the front-rear and right-left directions and in the diagonal direction.

Embodiment 4

Figure 6:
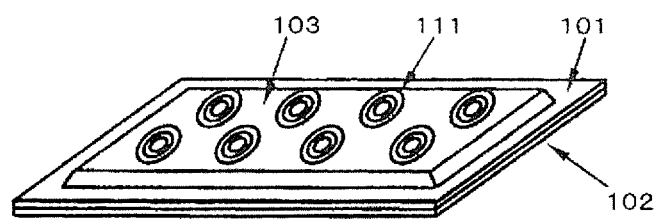
FIG. 6 is a view illustrating a thin pouch battery in which a concave-convex wave-shaped crest ridge or a trough furrow formed on a top surface of a protrusion of a laminate film is concentric, in Embodiment 4.

FIG. 6 illustrates a state in which the concave-convex wave-shaped crest ridge or trough furrow formed in the laminate film, is continuous to have a circular shape.

A plurality of wave-shaped crest ridges or trough furrows are formed to have concentric circular shapes (concentric crest ridges or trough furrows 111), and the laminate film is dotted with the circular shapes. Since the wave-shaped, crest ridges or trough furrows are formed to have circular shapes, the top surface of protrusion 103 of the laminate film on the upper side extends in every direction such that wrinkling or cracking does not appear, even when the battery is curved in any direct ion. In the present embodiment, although an example in which ridges and furrows are continuous to have circular shapes is described, the ridges may be continuous to have a polygonal shape such as a triangular shape or a quadrangular shape, as a variation.

Embodiment 5

Figure 7:
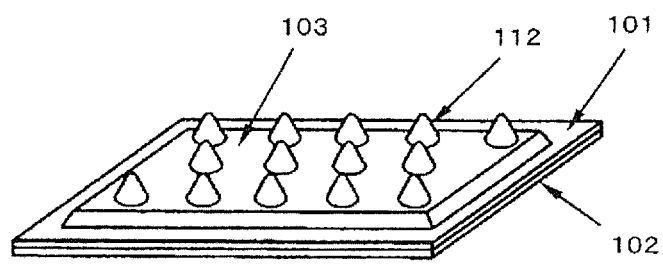
FIG. 7 is a view illustrating a thin pouch battery in which a convex shape is formed on a top surface of a protrusion of a laminate film, in Embodiment 5.

FIG. 7 illustrates a mode in which convex shapes are formed, in the laminate film. A plurality of convex shapes 112 are formed on the laminate film and are dotted around.

In the present embodiment, the top surface of protrusion 103 of the laminate film on the upper side also extends in every direction such that wrinkling or cracking does not appear, even when the battery is curved in any direction. In the present embodiment, especially, convex shapes are formed; however, concave shapes or concave and convex shapes may be dotted around.

Embodiment 6

Figure 8A:
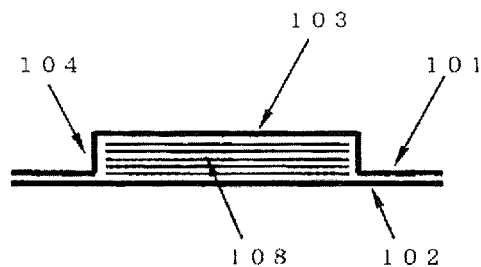
FIGS. 8A and 8B are sectional views illustrating a thin pouch battery in which a side surface of a protrusion, of a laminate film is inclined, in Embodiment 6.
Figure 8B:
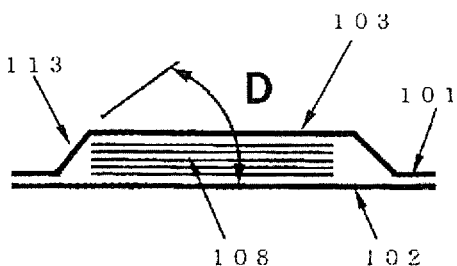

FIGS. 8A and 8B illustrate a mode in which the side surfaces of the protrusion in the laminate film are inclined.

When the battery is curved, side surface 104 of the protrusion, in which, electrode group 108 is inserted, of laminate film 101 on the upper side in FIG. 8A is likely to receive significant, tensile stress, and wrinkling or cracking is likely to appear.

Therefore, as illustrated in FIG. 5B, side surface 113 of the protrusion, of laminate film 101 on the upper side is inclined, and thereby it is possible to reduce the tensile stress. A height of side surface 104 of the protrusion in FIG. 8A is the same as a height of side surface 113 of the protrusion in FIG. 8B; however, the side surface is inclined, and thereby a length thereof to the top surface of protrusion 103 can be longer. Since as an allowable length, the length equal to or greater than 1.1 times the height is appropriate, it is desirable that inclined angle D of side surface 113 of the protrusion is equal to or less than 60°. In this manner, side surface 113 of the protrusion is inclined, and thereby it is possible to suppress wrinkling or cracking of the side surface of the protrusion at the time of curvature.

Embodiment 7

Figure 9:
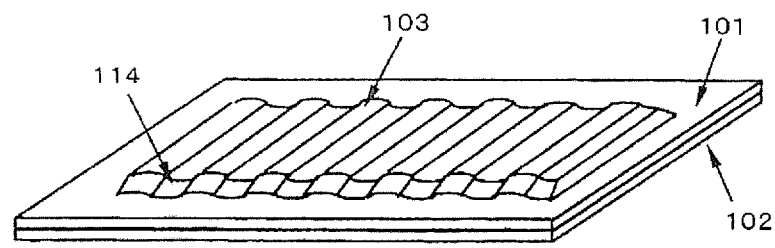
FIG. 9 is a view illustrating a thin pouch battery in which a wave shape is formed on a side surface of a protrusion of a laminate film, in Embodiment 7.

FIG. 9 illustrates a mode in which a wave shape is formed in the side surfaces of the protrusion in the laminate film.

Figure 10:
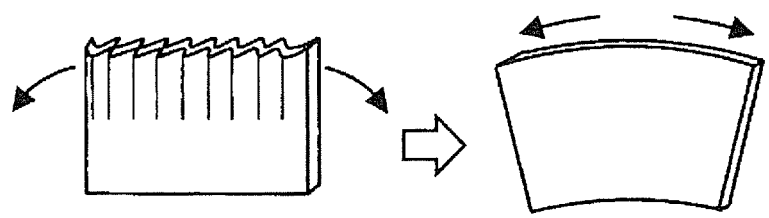
FIG. 10 is a view illustrating a state of a part when the side surface of the protrusion is curved.

As illustrated in FIG. 10, the wave shape is formed in advance on the side surface of the protrusion, the waves are extended, and it is possible to prevent the occurrence of wrinkling or cracking. As illustrated in FIG. 9, similar to the wave shape formed on the top surface of protrusion 103 of laminate film 101, the wave shape is also formed in side surface 114 of the protrusion.

At this time, the wave shape of side surface 114 of the protrusion is formed after the process of protrusion 103 is performed. According to the method, since, the wave shape is formed on the side surface of the protrusion after the protrusion, is formed as illustrated in FIG. 3, the wave shape in the side surface is not crushed.

Embodiment 8

Figure 11:
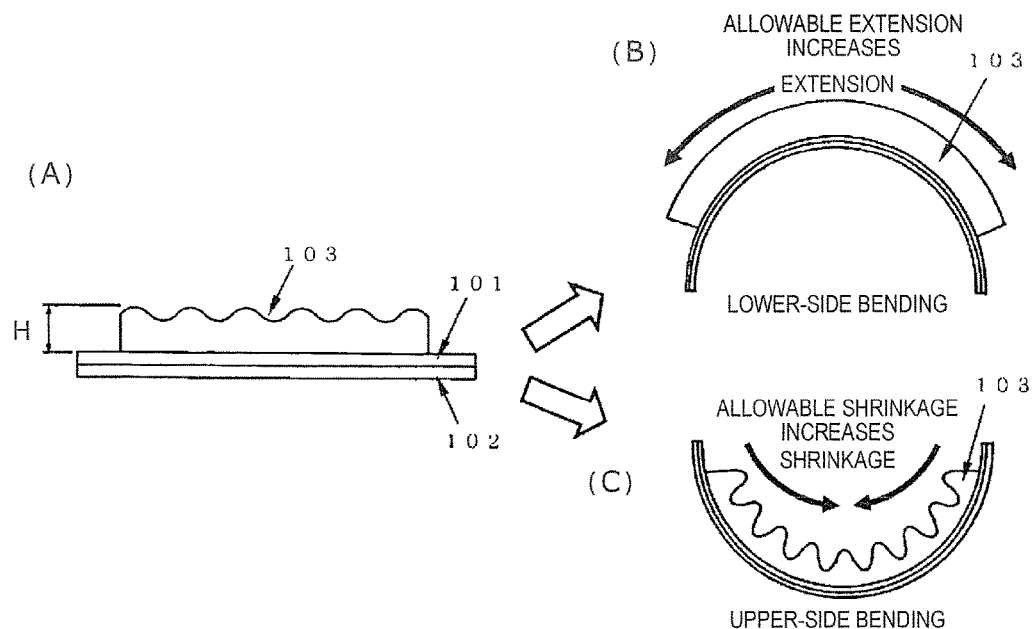
FIG. 11 illustrates a state in which a pouch battery having the protrusion in the laminate film on the upper side is curved upward or downward.
Figure 12:
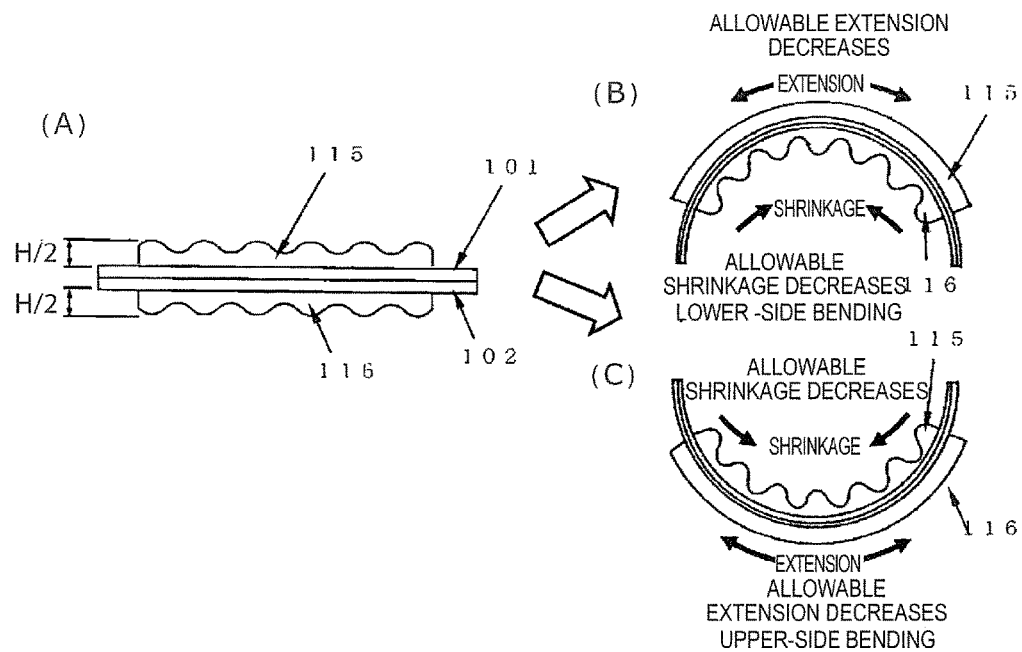
FIG. 12 illustrates a state in which the pouch battery having the protrusions on both sides of the laminate films on the upper side and the lower side is curved upward or downward.

FIG. 11 illustrates a state in which the protrusion is set in the laminate film, on the upper side and, in this state, upward or downward curvature is performed. FIG. 12 illustrates a state in which the protrusions are set on both sides of the laminate films on the upper side and the lower side, and upward or downward curvature is performed.

Protrusion 103 is set only on laminate film 101 on the upper side as illustrated in (A) of FIG. 11. Then, when the upward curvature is performed as illustrated in (B) of FIG. 11, extension stress acts on the wave shape formed on the top surface of protrusion 103 and the wave extends. As a result, the battery is curved without wrinkling.

In comparison, when the downward curvature is performed as illustrated in (C) of FIG. 11, compressive stress acts on the wave shape formed on the top surface of the protrusion and the wave shrinks. As a result, the battery is curved without wrinkling. However, when height H of protrusion 103 is significant, the degree of extending of the wave in the case of the upward curvature or a degree of shrinking of the wave in the case of the downward curvature is greater such that it is not possible to cope with the extending or shrinking of the wave, and wrinkling is likely to appear.

As illustrated in (A) of FIG. 12, protrusion 115 is set in laminate film 101 on the upper side and protrusion 116 is formed in laminate film 102 on the lower side. Since the protrusions are set in laminate films on the upper and lower sides, it is possible to set a height of the protrusion to be a half (H/2) the height, respectively, with respect to height H illustrated in (A) of FIG. 11.

In this state, when downward curvature is performed as illustrated in (B) of FIG. 12, the wave formed on protrusion 115 of laminate film 101 on the upper side extends and the wave formed on protrusion 116 of laminate film 102 on the lower side is compressed.

In comparison, when upward curvature is performed as illustrated in (C) of FIG. 12, inversely, the wave formed on protrusion 115 of laminate film 101 on the upper side is compressed, and the wave formed on protrusion 116 of laminate film 102 on the lower side extends.

When protrusion 103 is disposed only on one side illustrated in (A)-(C) of FIG. 11, the top surface of protrusion 103 only extends in the case of the downward, curvature, and is only compressed in the case of the upward curvature; however, the degree thereof is significant. However, as illustrated in (A) of FIG. 12, when the protrusions are disposed on both sides, during the downward curvature and the upward, curvature, the top surface of the protrusion, on the one side extends and the top surface of the protrusion on the other side shrinks; however, the degree thereof is small. Therefore, in a case where the height of the protrusion is significant, the protrusions are set on both sides as illustrated in (A) of FIG. 12, and thereby it is also effective in that wrinkling does not appear during the curvature.

In this embodiment, it is possible to further achieve effects that wrinkling or cracking does not appear during deformation and curvature by combining a plurality of embodiments.

Figure 13:
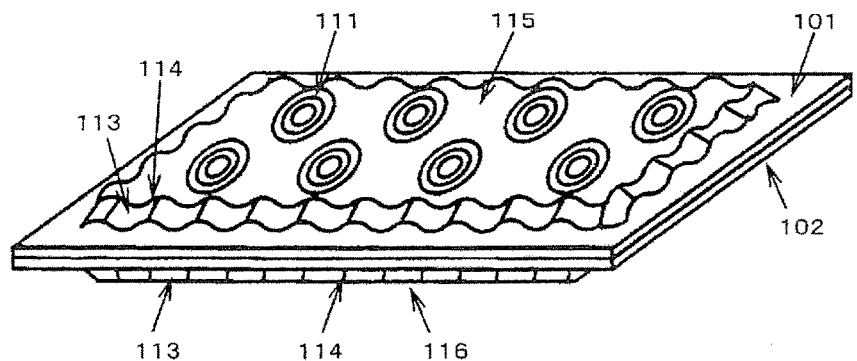
FIG. 13 is a view illustrating a thin pouch battery in which the embodiments are combined.
Figure 14:
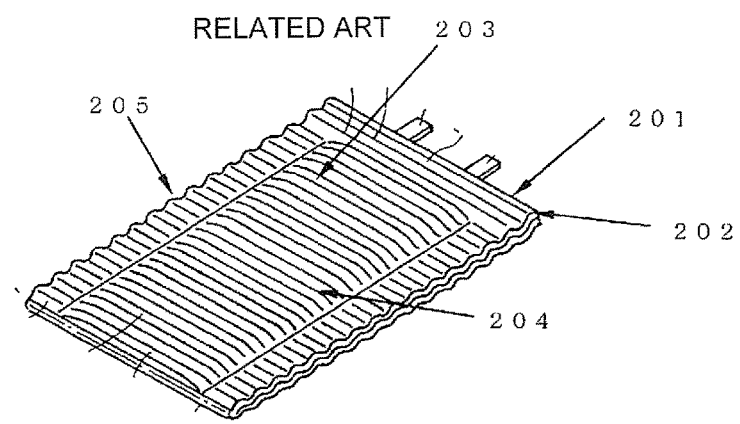
FIG. 14 is a view illustrating a thin pouch, battery in the related art, which has flexibility, disclosed in Japanese Patent Unexamined Publication No. 2000-173559.
Figure 15A:
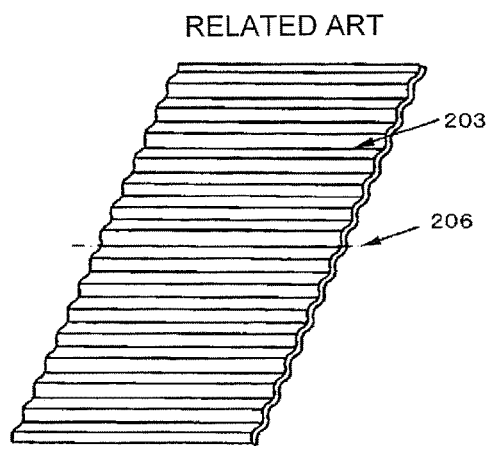
FIGS. 15A and 15B are views illustrating the thin pouch battery in the related art, which has flexibility, disclosed in Japanese Patent Unexamined Publication No. 2000-173559.
Figure 15B:
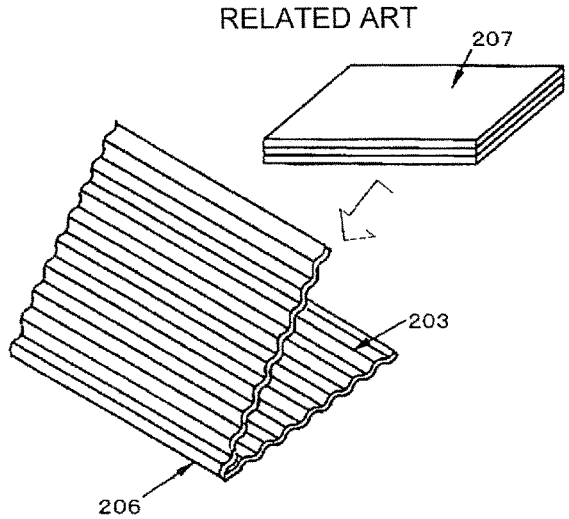
Figure 16A:
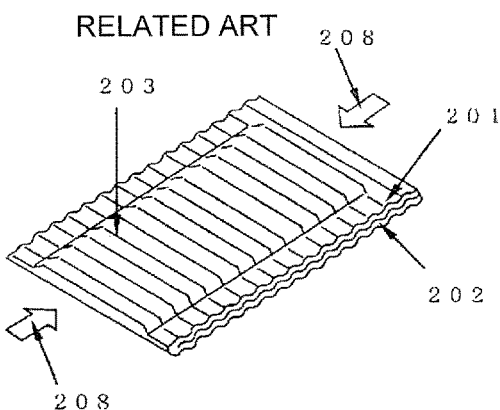
FIGS. 16A and 16B are views illustrating a state in which as external force is applied to the thin pouch battery having flexibility in the related art and the thin pouch battery is curved.
Figure 16B:
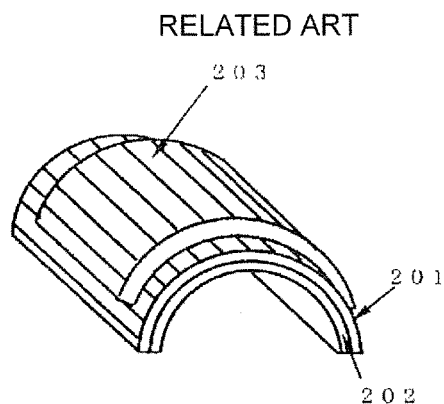
Figure 17A:
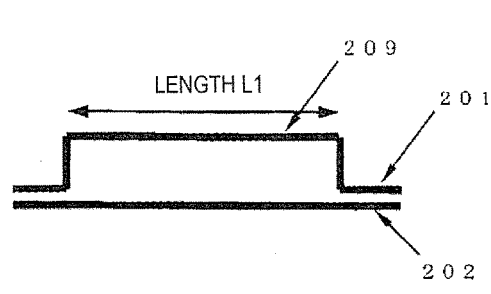
FIGS. 17A and 17B are diagrams depicting a wrinkling mechanism in a case where no wave shape is formed on the laminate films.
Figure 17B:
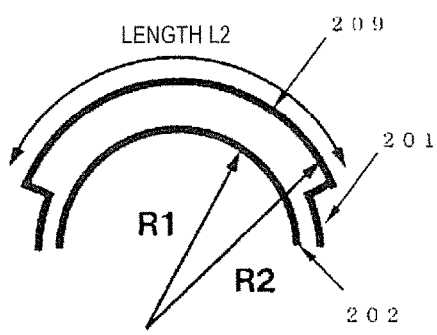
Figure 18A:
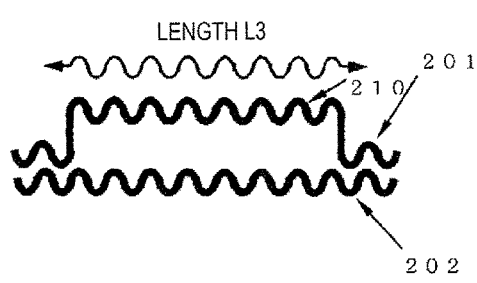
FIGS. 18A and 18B are diagrams depicting a curved state in a method in the related art, in which a wave shape is formed on the laminate films.
Figure 18B:
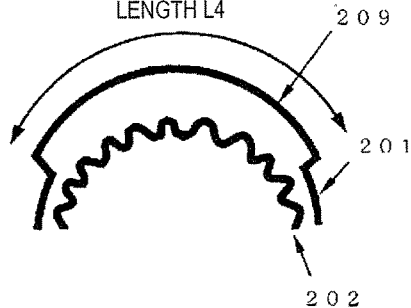
Figure 19A:
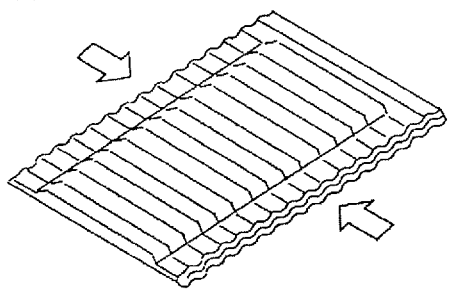
FIGS. 19A and 19B are views illustrating a state in a case where an external force is applied to the laminate films in a direction parallel to the ridge of the wave.
Figure 19B:
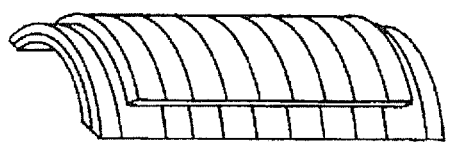
Figure 20:
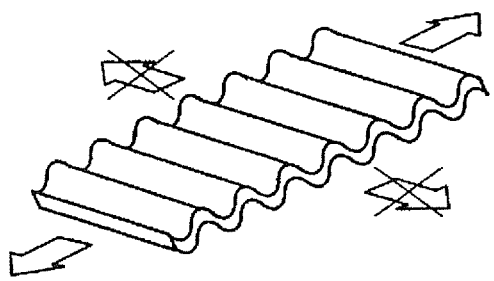
FIG. 20 is a view illustrating a state in which the laminate film is extended in the perpendicular direction and a parallel direction to the ridge of the wave.
Figure 21A:
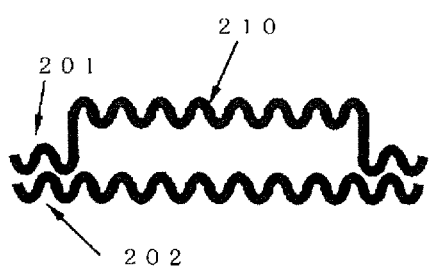
FIGS. 21A and 21B are diagrams illustrating a state in which the laminate films are curved downward from the upper side.
Figure 21B:
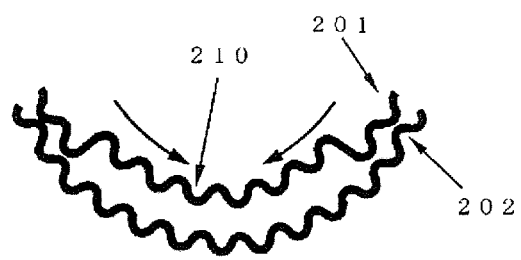
Figure 22:
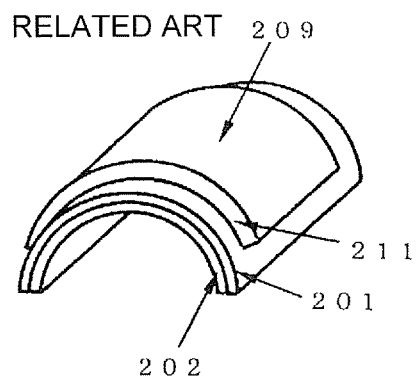
FIG. 22 is a view illustrating a state in which the laminate films are curved.
Figure 23:
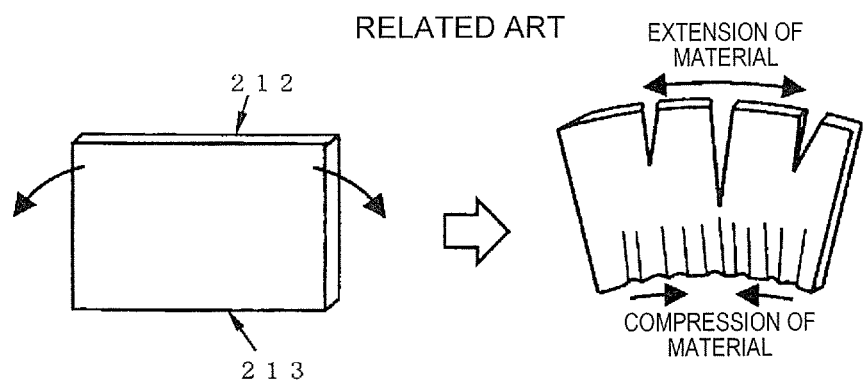
FIG. 23 is a view illustrating a state of a part when the side surface of the protrusion is curved.
Figure 24:
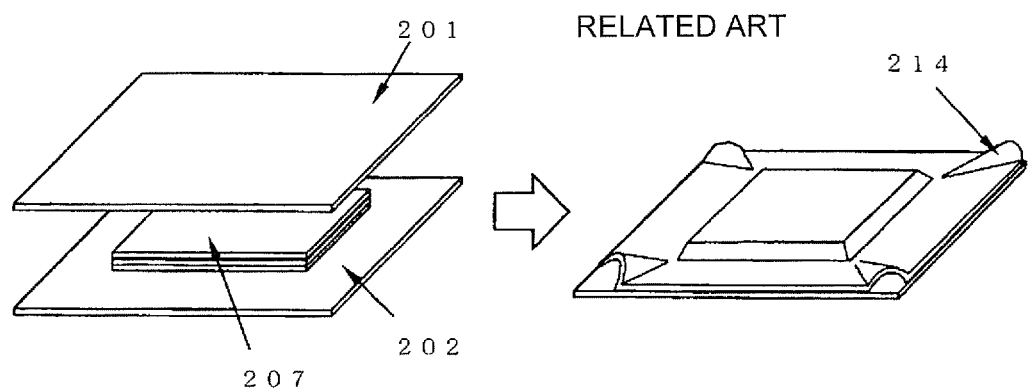
FIG. 24 is a view illustrating a state in a case where the protrusion of the laminate film, which accommodates an electrode group, is bonded on four sides without performing a process in advance.

As an example, FIG. 13 is a view illustrating a state in a case in which protrusions 115 and 116 are set on laminate film 101 on the upper side and on laminate film 102 on the lower side, and a concentric concave-convex wave shape (concentric crest ridges or trough furrows 111) is formed on the top surface of protrusions 115 and 116 so as to extend or shrink in any direction, and in which side surface 113 of the protrusion is gradually inclined and the wave shape is formed. Depending on a usage circumstance or a required specification of the battery, there is a need to select an optimal laminate film.

The battery according to the various exemplary embodiments can be applied to a thin pouch battery, which is likely to be curved or deformed when an external force is applied such as a compact portable electronic apparatus or a portable electronic terminal, as a power source.

What is claimed is:

1. A battery comprising:
    laminate films that interpose an electrode group including an electrode, a separator, and an electrolyte,
    wherein, on a top surface of a protrusion of the laminate films, in which the electrode group is interposed therebetween, a plurality of concave and convex portions, which are not continuous in straight lines from one end of the top surface to the other end thereof, are formed,
    wherein the plurality of concave or convex portions are in a state of being alternately parallel to side surfaces of the protrusion in the right-left direction and to side surfaces thereof in the front-rear direction, and of being continuous in a step shape.

2. The battery of claim 1,
wherein a cross section of the laminate film has a wave shape and a top ridge of a wave crest and a furrow of a wave trough are curved and continuous to each other.

3. The battery of claim 1,
wherein a cross section of the laminate film has a wave shape and a top ridge of a wave crest and a furrow of a wave trough are continuous to each other to have a circular shape, and the circular waves are dotted around.

4. The battery of claim 1,
wherein a partial cross section of the laminate film has a concave or convex shape and the concave or convex shapes are dotted around.

5. The battery of claim 1,
wherein the protrusion of the laminate film has a side surface that is set to be inclined at an angle of equal to or less than 60°.

6. The battery of claim 5,
wherein the protrusion of the laminate film has the side surface on which concave or convex shapes or wave shapes are formed.

7. The battery of claim 2,
wherein after or while the protrusion is formed on the laminate film, plurality of concave and convex portions are formed.

8. The battery of claim 1,
wherein, of the laminate films, the protruding shapes are formed on both of one laminate film and the other laminate film facing the one laminate film.

* * * * *